US006638327B2

(12) United States Patent
Hara

(10) Patent No.: US 6,638,327 B2
(45) Date of Patent: Oct. 28, 2003

(54) METHOD FOR REPAIRING AND LUSTERING DEFECTS ON HYDROPHILIC COAT SURFACE

(75) Inventor: Fujio Hara, Tokyo (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/203,957

(22) PCT Filed: Mar. 2, 2001

(86) PCT No.: PCT/US01/06760
§ 371 (c)(1),
(2), (4) Date: Aug. 13, 2002

(87) PCT Pub. No.: WO01/64354
PCT Pub. Date: Sep. 7, 2001

(65) Prior Publication Data
US 2003/0032368 A1 Feb. 13, 2003

(30) Foreign Application Priority Data
Mar. 2, 2000 (JP) ........................................ 2000-057129

(51) Int. Cl.[7] .............................. C09D 7/00; C09G 1/02; C09G 1/04
(52) U.S. Cl. .............................. 51/307; 51/308; 51/309; 106/3; 106/10; 134/6; 451/36
(58) Field of Search ..................... 134/6, 7; 451/36; 51/307, 308, 309; 106/3, 10

(56) References Cited

U.S. PATENT DOCUMENTS

| 3,294,726 | A |   | 12/1966 | Wyner |
| 3,624,015 | A | * | 11/1971 | Vaughn et al. ............... 524/145 |
| 5,531,814 | A |   | 7/1996  | Bahr et al. |
| 5,913,969 | A |   | 6/1999  | Howe |

FOREIGN PATENT DOCUMENTS

EP          0 042 281 B1    8/1984

\* cited by examiner

Primary Examiner—Michael Marcheschi

(57) ABSTRACT

A method for repairing and lustering defects on a hydrophilic coat surface is reported. The method comprises the steps of applying a buffing composition on a hydrophilic coat surface; and buffing the hydrophilic coat surface to which the buffing composition has been applied. The buffing composition is an aqueous composition which comprises water and a water-soluble high-boiling-point liquid organic compound, and further comprises either a combination of abrasive particles and a dispersant, or lustering agent, or the both. The method allows for the removal of defects on a hydrophilic coat surface with good finish after repairing and without deteriorizing the antifouling function of the hydrophilic coat against urban fouling substances.

6 Claims, No Drawings

METHOD FOR REPAIRING AND LUSTERING DEFECTS ON HYDROPHILIC COAT SURFACE

FIELD

The present invention relates to a method for repairing and lustering defects on a hydrophilic coat surface and, in particular, to a method for repairing and lustering defects on a hydrophilic coat surface that requires a very fine finish, such as an automobile coat surface.

BACKGROUND

Painting is generally performed on an automobile surface for the purpose of imparting surface protection, desired colors, and aesthetic appearance. Painting is an operation to spread a paint (i.e., is a resin composition) over the surface of an automobile body and to harden the paint to form a continuous resin-coated film having an approximately uniform thickness. The resin-coated film formed on the surface of an object by painting is called a coat.

If some functional hindrance of the paint (e.g., foaming, adhesion of dust, or the like) occurs during the painting step, the uniformity, continuity, or the surface flatness of the coat to be formed is inhibited, and defects such as haze marks, recesses, and wounds may be generated on the coat surface. Defects are also generated on the coat surface when the uniformity, the continuity, or the surface flatness of the coat is altered by friction or collision of the automobile body after the coat is formed. If the defects are present on the coat surface, the aesthetic appearance of the automobile body is deteriorated, and the value of the automobile is decreased. For this reason, defects on the coat surface must be repaired and polished.

Japanese Patent Laid-open Publication No. 02-269791 discloses a method for repairing the defects on the coat surface. According to this method, the defects of the coat are removed by first sanding with a very fine grade polishing material. Next, the trace of the removed defects is buffed using a buffing composition to remove the scratches produced by the sanding step. Finally, the residual buffing composition is removed using a cotton cloth, thereby producing a uniform, glossy finish. One suitable buffing composition for use in this method is commercially available under the trade designation "FINESSE-IT" from Minnesota Mining and Manufacturing Company.

Various functional paints have been developed in recent years, and a coat is known which exhibits an excellent antifouling property against fouling substances specific to urban areas (e.g., smoke and exhaust gas). For example, "Painting Technology", Vol. 31, No. 7 (1996), pp. 268–273 explains a mechanism of the antifouling function exhibited by such a low-fouling type coat against urban fouling substances. Since the low-fouling type coat has a high surface energy and shows a hydrophilic and oil-repellent property, oleophilic fouling substances (e.g., smoke and exhaust gas) are unlikely to adhere to the coat and, if they adhere, are easily washed away by rain or the like.

When defects are generated on the surface of the low-fouling type coat and if an attempt is made to repair the defects by a conventional method, problems arise such as insufficient removal of the defects, poor finish after repairing, and deterioration of the antifouling property of the coat against urban fouling substances after repairing. These problems are raised because oleophilic ingredients (e.g., aliphatic hydrocarbon and petroleum-based solvents) are contained in the buffing composition used in the step of buffing the coat surface. These oleophilic ingredients are not compatible with the hydrophilic coat and have an insufficient polish promoting function. Once the oleophilic ingredients penetrate into the hydrophilic coat they cannot be easily removed, so that the hydrophilic and oil-repellent function is deteriorated on a portion of the coat surface where the oleophilic ingredients have penetrated. On the other hand, if the oleophilic ingredients are removed from the buffing composition, removal of the defects by the buffing step will be insufficient, thereby giving a poor finish after repairing

SUMMARY

The present invention provides a method for repairing and lustering defects on a coat surface, by which method the defects on a hydrophilic coat surface is sufficiently removed with good finish after repairing, and the antifouling function of the hydrophilic coat against urban fouling substances is not deteriorated. The method of the present invention comprisies the steps of applying a buffing composition on a hydrophilic coat surface; and buffing the hydrophilic coat surface to which the buffing composition has been applied, wherein said buffing composition is an aqueous composition which comprises water and a water-soluble high-boiling-point liquid organic compound, and further contains either a combination of abrasive particles and a dispersant, a lustering agent, or both.

DETAILED DESCRIPTION

The buffing composition for use with the method of the present invention is an aqueous composition containing water and a water-soluble high-boiling-point liquid organic compound, and further containing either a combination of abrasive particles and a dispersant, a lustering agent, or both.

Water-Soluble High-Boiling-Point Liquid Organic Compound:

Preferred water-soluble high-boiling-point liquid organic compounds, are those that are effective in swelling and softening the hydrophilic coat. Softening the hydrophilic coat improves the polishing performance of the buffing composition.

The hydrophilic coat may be generally an acrylic melamine resin, an aminoalkyd resin, a urethane resin, or the like. The hardness of such a coat is generally H to 2H (JIS (1979, K5400)) before it is swollen with the water-soluble high-boiling-point liquid organic compound. On the other hand, after it is swollen with the water-soluble high-boiling-point liquid organic compound, the hardness of the coat is preferably about B in view of promoting the polishing.

Since the buffing step is generally carried out for 1 to 5 minutes at an ambient temperature of 25 to 60° C., the water-soluble high-boiling-point liquid organic compound must be slightly volatile to such a degree that it is not dried during the buffing step. Accordingly, the water-soluble high-boiling-point liquid organic compound preferably has a boiling point of not less than 100° C., more preferably not less than 130° C.

The water-soluble high-boiling-point liquid organic compound preferably has a carbon number of 3 to 12, more preferably 3 to 6. If the carbon number is less than 3, the boiling point will be too low and it will be dried during the polishing step. If the carbon number exceeds 12, the ability of the water-soluble high boiling-point liquid organic compound to swell the coat will decrease.

Also, the water-soluble high-boiling-point liquid organic compound is preferably one that can be easily washed away with water with little remaining in the inside of the coat, even if it adheres to the coat surface. Further, even if a small amount remains, it is preferably one that does not give an adverse effect on the hydrophilic, oil-repellent function of the hydrophilic coat.

Preferable examples of water-soluble high-boiling-point liquid organic compounds are polyhydric alcohols, hydroxyketones, and ether or ester derivatives of polyhydric alcohols. Specific examples include ethylene glycol diglycidyl ether, ethylene glycol dimethyl ether, ethylene glycol monoacetate, ethylene glycol monoethyl ether, ethylene glycol monobutyl ether, ethylene glycol monomethyl ether acetate, ethylene glycol monomethoxymethyl ether, ethylene chlorohydrin, glycerol, diethylene glycol diacetate, diethylene glycol dimethyl ether, diethylene glycol monoethyl ether, diethylene glycol monoethyl ether acetate, diethylene glycol monobutyl ether, diethylene glycol monomethyl ether, dipropylene glycol monoethyl ether, dipropylene glycol monomethyl ether, triethylene glycol monoethyl ether, triethylene glycol monomethyl ether, propylene glycol monobutyl ether, diacetone alcohol, propylene glycol monomethyl ether, and others.

Among these, especially preferable water-soluble high-boiling-point liquid organic compounds are diacetone alcohol and propylene glycol monomethyl ether. These are excellent especially in the swelling property of the coat, and the polishing performance of the buffing composition.

The water-soluble high-boiling-point liquid organic compound is typically present in the buffing composition at 1 to 50 parts by weight, more preferably at 1 to 30 parts by weight, most preferably at 3 to 10 parts by weight with respect to 100 parts by weight of water. If the blended amount of the water-soluble high-boiling-point liquid organic compound is less than 1 part by weight, the coat will not swell sufficiently, failing to provide a polishing promoting effect, whereas if it exceeds 50 parts by weight, the coat will be too soft to provide a good finish on the coat surface after repairing.

Abrasive Particles:

Abrasive particles are a particulate material which provide a polishing effect. They are preferably a hard material which has a good cutting property and which does not give deep wounds easily on the polished surface when they are used as free abrasive particles. The average particle size of the abrasive particles is preferably from 10 nm to 100 $\mu$m, more preferably from 1 to 10 $\mu$m. The particle size distribution should be fairly narrow so that the buffing composition does not produce any undesired scratches.

The material of the abrasive particles is preferably aluminum oxide, silica, aluminum silicate, talc, kaolin, clay, or a mixture thereof. Especially preferable abrasive particles are alumina particles.

The abrasive particles are included in the buffing composition if a buffing function is desired. The content of the abrasive particles is not more than 60 parts by weight, preferably 10 to 60 parts by weight, more preferably 20 to 40 parts by weight with respect to 100 parts by weight of water. If the abrasive particles are included in an amount of 60 parts by weight, the polishing performance is not improved; and on the contrary, the finish of the coat surface after repairing is deteriorated.

Dispersant:

A dispersant is included in the buffing composition so that the abrasive particles do not agglomerate. Since the buffing composition of the present invention is an aqueous composition containing water, a water-soluble high-boiling-point liquid organic compound, abrasive particles, and other ingredients, the dispersant must perform the function of dispersing the abrasive particles, even in a water-alcohol medium.

The dispersant may be generally a water-soluble surfactant. Specific examples include polycarboxylic acids and salts thereof, polyaminoamides, and acid esters thereof.

The dispersant is included in the buffing composition preferably at an amount of 0.5 to 5 parts by weight with respect to 100 parts by weight of water. If the amount of the dispersant is less than 0.5 part by weight, the abrasive particles tend to agglomerate in the buffing composition, whereas if the dispersant is included in an amount exceeding 5 parts by weight, the dispersibility of the abrasive particles is not improved and they are likely to remain on the coat surface after repairing.

Lustering Agent:

A lustering agent is included in the buffing composition so as to make a finer finish or to impart luster to the coat surface after repairing. This makes the repairing and lustering method of the present invention also suitable as a countermeasure against so-called hazing of the coat surface. Since the lustering agent is a component that performs a function of filling fine wounds by remaining on the coat surface after repairing, the lustering agent is preferably one that does not give an adverse effect on the hydrophilic oil-repellent function of the hydrophilic coat.

The lustering agent to be used may be a hydrophilic silicone or a hydrophilic wax. Specific examples include polyether denatured silicone, hydrophilic aminosilicone, hydrophilic epoxy silicone, glycerol, hydrogenated castor oil and derivatives thereof, amido compounds, and others.

In particular, a hydrophilic aminosilicone composed of a block copolymer of polyether and amino denatured silicone is preferred because it remains on the coat surface or inside the coat and produces an effect of maintaining the luster and the hydrophilicity of the coat.

The amount of the lustering agent may be suitably adjusted in accordance with the required finish of the coat surface after repairing. Generally, the lustering agent is allowed to be contained in the buffing composition in an amount of not more than 10 parts by weight, preferably 0.5 to 10 parts by weight, with respect to 100 parts by weight of water. Even if the lustering agent is allowed to be contained at an amount exceeding 10 parts by weight, the finish of the coat surface after repairing is not significantly improved.

Other Additives:

Thickeners can be added to increase and adjust the viscosity of the buffing compositions of the present invention. If the viscosity of the buffing composition is too low, it tends to run down the vertical surfaces of the automobile, and consequently, the operators cannot properly buff with it. Therefore, thickeners are utilized to adjust the viscosity of the buffing composition.

Typical examples of thickeners include hydrous aluminum silicate, a dimethyldioctadecyl salt of montmorillonite clay, an alkali-soluble acrylic polymer emulsion, colloidal silica, heavy metal soaps such as lead oleate, zinc oleate, zinc stearate, and aluminum stearate. The preferred thickener for use with the present invention is an aqueous alkali-soluble acrylic polymer emulsion.

Stabilizers and preservatives can be employed to inhibit bacterial growth in the buffing composition. Typical examples include methyl paraben, ethyl paraben, propyl paraben, butyl paraben, potassium sorbate, sorbic acid, and o-phenylphenol.

Pigments, dyes, and perfumes can also be added to the buffing composition of the invention as desired.

Preparation of Buffing Composition:

A buffing composition for use with the method of the present invention is obtained by mixing the above-mentioned components with water. The water for use may be tap water, distilled water, or deionized water. Deionized water is preferred because the likelihood of bacterial growth is reduced due to the removal of ions and other minerals which may promote microbial growth in the buffing composition.

The order of addition in preparing the buffing composition is, for example, water, additives, a water-soluble high-boiling-point liquid organic compound, a lustering agent, a dispersant, and abrasive particles. The mixture is continuously mixed as the various ingredients are added. Thereafter, the buffing composition is mixed to form a homogeneous dispersion with a high shear mixer.

Method for Repairing and Lustering Defects on a Hydrophilic Coat Surface:

According to the method of the present invention, surface defects are first discovered on the coat surface. The surface defects are, for example, haze marks caused by poor hardening, pinholes caused by foaming in painting, abrasions caused by friction of an automobile body, adhesion of dusts, and scratches, hazing, and others remaining after these defects are removed in the sanding step. Then, the buffing composition is applied to the area on the hydrophilic coat surface where the surface defects are formed.

Next, the hydrophilic coat surface, to which the buffing composition has been applied, is buffed. The buffing is generally performed in the following manner. First, a buffing pad is secured to a buffing tool. The pad and the buffing tool for use can be, for example, those manufactured by Minnesota Mining and Manufacturing Company. Next, the buffing pad is placed on the coat surface to which the buffing composition has been applied. The tool is turned on, and the coat surface is buffed as pressure is applied to the tool. The buffing period is typically 3 to 30 seconds. The buffing may be performed several times as the pressure is increased or decreased.

Thereafter, the buffing composition remaining on the polished surface is removed by means of washing with water, wiping with woven cloth (e.g., cotton cloth), non-woven cloth, very fine fiber cloth of 0.1 to 0.5 denier, or the like. An additional step of polishing the surface may result in an even finer finish.

EXAMPLES

The present invention will be described further specifically by the following Examples. However, the present invention is in no way limited to the examples. In the Examples, "parts" are based upon weight unless otherwise indicated.

Example 1

The buffing composition of this Example was made by mixing 100 parts of ion-exchange water, 2 parts of polycarboxylate (commercially available under the trades designation "Carbopol" from BF Goodrich Co., Ltd.), 1 part of triethanolamine, 5 parts of diacetone alcohol, and 30 parts of aluminum oxide particles having an average particle size of 5 μm, and stirring the mixture to form a uniform dispersion with a high shear mixer.

Example 2

The buffing composition of this Example was made according to the procedure used in Example 1, except that diacetone alcohol was replaced with propylene glycol monomethyl ether.

Example 3

The buffing composition of this Example was made according to the procedure used in Example 3, except that 1 part of hydrophilic aminosilicone (a block copolymer of polyether and amino-denatured silicone commercially available under the trade designation "NUC-SILICONE" from Nippon Unicar Co., Ltd.), was also added.

Example 4

The buffing composition of this Example was made according to the procedure used in Example 3, except that hydrophilic aminosilicone was replaced with a hydrogenated castor oil (commercially available under the trade designation "EMULSION A OIL" from CASCHEM Co., Ltd.).

Example 5

The buffing composition of this Example was made according to the procedure used in Example 3, except that hydrophilic aminosilicone was replaced with glycerol.

Example 6

The buffing composition of this Example was made according to the procedure used in Example 1, except that diacetone alcohol was replaced with propylene glycol monoethyl ether acetate.

Example 7

The buffing composition of this Example was made according to the procedure used in Example 1, except that diacetone alcohol was replaced with acetylacetone.

Example 8

The buffing composition of this Example was made according to the procedure used in Example 1, except that diacetone alcohol was replaced with ethylene glycol monomethyl ether acetate.

Example 9

The buffing composition of this Example was made according to the procedure used in Example 1, except that diacetone alcohol was replaced with ethylene glycol monomethyl ether.

Example 10

The buffing composition of this Example was made according to the procedure used in Example 1, except that diacetone alcohol was replaced with dipropylene glycol monomethyl ether.

Example 11

The lustering composition of this Example was made by mixing 100 parts of ion-exchange water, 5 parts of propylene glycol monomethyl ether, and 1 part of hydrophilic aminosilicone, and stirring the mixture to form a uniform dispersion with a high shear mixer. Comparative Example 1

The buffing composition of this Example was made by mixing 100 parts of ion-exchange water, 2 parts of polycarboxylate (commercially available under the trade designation "CARBOPOL" from BF Goodrich Co., Ltd.), 1 part of triethanolamine, and 30 parts of aluminum oxide particles having an average particle size of 5 μm, and stirring the mixture to form a uniform dispersion with a high shear mixer.

Comparative Example 2

A buffing composition commercially available under the trade designation "ULTRA FINISH" from Minnesota Mining and Manufacturing Company was used. This buffing composition contains an oleophilic component.

Performance Evaluation

The buffing compositions of Examples and Comparative Examples were left to stand at 50° C. for 7 days for observation by eye of presence or absence of separation and evaluation of stability of the compositions with the passage of time. The results are shown in Table 1 and Table 2.

The coat surface of a metal test panel painted with a black-colored hydrophilic coat was sanded using a grade 1500 sanding disc (commercially available under the trade designation "FINESSE-IT MICRO FINE" from Minnesota Mining and Manufacturing Company) attached to a hand sanding pad (commercially available under the trade designation "FINESSE-IT" from Minnesota Mining and Manufacturing Company). The sanding was done with a circular motion and approximately four drops of water were added to the sanding interface as a lubricant. The sanding step formed round scratches having a diameter of about 4 cm on the coat surface. The average roughness (Ra) of the scratches was about 0.15 μm over the entire surface of the area where the scratches were formed. Then, the painted panel was wiped dry with a cotton cloth.

Next, the prepared buffing composition was applied as a liquid drop having a diameter of about 1.5 cm to the sanded area. A buffing pad and a finishing pad, (commercially available under the trade designations "FINESSE-IT" and "FINESSE-If ROLOC", available from Minnesota Mining and Manufacturing Company) were secured to a rotary sander buffing tool.

The buffing pad was placed on top of the coat surface to which the buffing composition had been applied, and the finishing material was spread over this area before the buffing tool was started. The buffing tool was turned on and the sanded area was buffed for eight seconds as very firm pressure was applied to the tool. After the eight second period, the pressure was reduced, and it was buffed for additional three seconds.

Thereafter, the buffing composition remaining on the polished surface was washed with water and the polished surface was dried.

Then, the polished surface was lustered by using the lustering composition prepared in Example 11. The lustering composition of Example 11 was applied to a surface of coating which had been repaired by the buffing composition of Example 2, and the surface was buffed in the manner described above.

The polishing performance of each buffing composition, the finish of the coat surface, hydrophilicity, and stain resistance were evaluated. The results are reported in Table 1 and Table 2.

Buffing Performance:

If the scratches formed on the coat surface completely disappeared on the coat surface after repairing and lustering, it was rated as "o"; if they remained only faintly, it was rated as "Δ"; and if they remained conspicuously, it was rated as "x".

Finish

The 20° gloss of the polished surface was measured.

Hydrophilicity

Water was applied to the coat surface with a hand spray after repairing and lustering for observation of the state of adhering water. If the entire surface was wetted, it was judged that the hydrophilicity was "present". If water drops were formed, it was judged that the hydrophilicity was "absent".

Stain Resistance:

A test piece having a surface of coating which had been repaired and lustered was positioned horizontally. Onto the surface was sprinkled uniformly the 15 kinds of test dust defined in JIS Z 8901 (72% Kantoh loam, 23% carbon black, 5% cotton linter) thereafter, using a sieve. The test piece was placed in a high temperature oven at 50° C for 2 hours. It was removed from the oven and was left at room temperature for 1 hour.

The test piece was raised horizontally, and dropped slightly to pull down the test dust. The test piece was silently dipped in a water bath for 1 minute, and took out. Excessive water was wiped by using filter paper, and the test piece was left at room temperature for 1 hour.

Stain level of the surface of coating was evaluated visually. If the stain was came off, it was evaluated as "o". If the stain was stayed in, it was evaluated as "x".

TABLE 1

|  | Example | | | | | | |
| --- | --- | --- | --- | --- | --- | --- | --- |
|  | 1 | 2 | 3 | 4 | 5 | 6 | 7 |
| Composition | | | | | | | |
| Ion-exchange water | 100 | 100 | 100 | 100 | 100 | 100 | 100 |
| polycarboxylate | 2 | 2 | 2 | 2 | 2 | 2 | 2 |
| triethanolamine | 1 | 1 | 1 | 1 | 1 | 1 | 1 |
| aluminum oxide | 30 | 30 | 30 | 30 | 30 | 30 | 30 |
| propylene glycol monoethyl ether acetate |  |  |  |  |  | 5 |  |
| acetylacetone |  |  |  |  |  |  | 5 |
| diacetone alcohol |  | 5 |  |  |  |  |  |
| ethylene glycol monomethyl ether acetate |  |  |  |  |  |  |  |

TABLE 1-continued

|  | Example | | | | | | |
|---|---|---|---|---|---|---|---|
|  | 1 | 2 | 3 | 4 | 5 | 6 | 7 |
| propylene glycol monomethyl ether |  | 5 | 5 | 5 | 5 |  |  |
| ethylene glycol monomethyl ether |  |  |  |  |  |  |  |
| dipropylene glycol monomethyl ether |  |  |  |  |  |  |  |
| hydrophilic aminosilicone |  |  |  | 1 |  |  |  |
| hydrogenated castor oil |  |  |  |  | 1 |  |  |
| glycerol |  |  |  |  |  | 1 |  |
| Evaluation |  |  |  |  |  |  |  |
| Presence or absence of separation | Absent | Absent | Absent | Absent | Absent | Present | Present |
| Buffing performance | ○ | ○ | ○ | ○ | ○ | x | ○ |
| Finish | 78.5 | 78.1 | 82.5 | 81.0 | 78.4 | 68.2 | 69.7 |
| Hydrophilicity | Present | Present | Present | Present | Present | Present | Present |
| Stain resistance | ○ | ○ | ○ | ○ | ○ | ○ | ○ |

TABLE 2

|  | Example | | | | Comparative Example | |
|---|---|---|---|---|---|---|
|  | 8 | 9 | 10 | 11 | 1 | 2 |
| Composition |  |  |  |  |  |  |
| ion-exchange water | 100 | 100 | 100 | 100 | 100 | Conventional product "Ultra Finish" manufactured by 3M and containing an oleophilic component |
| polycarboxylate | 2 | 2 | 2 |  | 2 |  |
| triethanolamine | 1 | 1 | 1 |  | 1 |  |
| aluminum oxide | 30 | 30 | 30 |  | 30 |  |
| propylene glycol monoethyl ether acetate |  |  |  |  |  |  |
| acetylacetone |  |  |  |  |  |  |
| diacetone alcohol |  |  |  |  |  |  |
| ethylene glycol monomethyl ether acetate | 5 |  |  |  |  |  |
| propylene glycol monomethyl ether |  |  |  | 5 |  |  |
| ethylene glycol monomethyl ether |  | 5 |  |  |  |  |
| dipropylene glycol monomethyl ether |  |  | 5 |  |  |  |
| hydrophilic aminosilicone |  |  |  |  | 1 |  |
| hydrogenated castor oil |  |  |  |  |  |  |
| glycerol |  |  |  |  |  |  |
| Evaluation |  |  |  |  |  |  |
| Presence or absence of separation | Present | Absent | Absent | — | Absent | Absent |
| Buffing performance | △ | x | x | — | x | △ |
| Finish | 58.2 | 51.4 | 58.7 | 82.8 | 57.7 | 82.3 |
| Hydrophilicity | Present | Present | Present | Present | Present | Absent |
| Stain resistance | ○ | ○ | ○ | ○ | x | x |

The surface of coating which had been repaired and lustered by using the composition of Example was hydrophilic, and was superior in stain resistance by comparison with that of Comparative Example.

What is claimed is:

1. A method for repairing and lustering defects on a hydrophilic coat surface, comprising the steps of:
   (a) applying a buffing composition on a hydrophilic coat surface, said buffing composition comprising:
      water;
      a water-soluble high-boiling-point liquid organic compound having a carbon number of 3 to 12; and
      either (i) a combination of abrasive particles and a dispersant; (ii) a lustering agent, or both (I) and (ii); and
   (b) buffing the hydrophilic coat surface to which the buffing composition has been applied, wherein the water-soluble high-boiling-point liquid organic compound is not dried during the buffing step.

2. The method according to claim 1, wherein said buffing composition comprises relative to 100 parts by weight of water:
   (a) 1 to 50 parts by weight of the water-soluble high-boiling-point liquid organic compound;

(b) not more than 60 parts by weight of the abrasive particles; and (c) 0.5 to 5 parts by weight of the dispersant.

3. The method according to claim 1, wherein said buffing composition comprises with respect to 100 parts by weight of water:

(a) 1 to 50 parts by weight of the water-soluble high-boiling-point liquid organic compound; and (b) 0.5 to 10 parts by weight of the lustering agent.

4. The method according to claim 1, wherein said buffing composition comprises with respect to 100 parts by weight of water:

(a) 1 to 50 parts by weight of the water-soluble high-boiling-point liquid organic compound;

(b) not more than 60 parts by weight of the abrasive particles;

(c) 0.5 to 5 parts by weight of the dispersant; and (d) 0.5 to 10 parts by weight of the lustering agent.

5. The method according to claim 1, wherein said water-soluble high-boiling-point liquid organic compound is selected from the group consisting of polyhydric alcohols having a carbon number of 3 to 12, hydroxyketones having a carbon number of 3 to 12, and ether or ester derivatives of polyhydric alcohols, the ester derivatives having a carbon number of 3 to 12.

6. The method according to claim 1, wherein said water-soluble high-boiling-point liquid organic compound is diacetone alcohol or propylene glycol monomethyl ether.

* * * * *

UNITED STATES PATENT AND TRADEMARK OFFICE
CERTIFICATE OF CORRECTION

PATENT NO. : 6,638,327 B2
DATED : October 28, 2003
INVENTOR(S) : Hara, Fujio

It is certified that error appears in the above-identified patent and that said Letters Patent is hereby corrected as shown below:

Column 2,
Line 17, delete "is" and insert in place thereof -- are --.
Lines 20-21, delete "com-prisies" and insert in place thereof -- comprises --.

Column 4,
Line 44, delete "at" and insert in place thereof -- in --.

Column 5,
Line 58, delete "trades" and insert in place thereof -- trade --.

Column 6,
Line 63, "Comparative Example 1" should be a new paragraph.

Column 7,
Line 37, delete "FINESSE-If" and insert in place thereof -- FINESSE-IT --.

Column 8,
Line 42, delete "took" and insert in place thereof -- taken --.
Lines 46 and 47, delete "was" following the word "stain".

Column 10,
Line 57, delete "(I)" and insert in place thereof -- (i) --.

Signed and Sealed this

Thirteenth Day of April, 2004

JON W. DUDAS
*Acting Director of the United States Patent and Trademark Office*